United States Patent
Tan et al.

(10) Patent No.: US 8,141,588 B2
(45) Date of Patent: Mar. 27, 2012

(54) FLOW CONTROL METHOD AND APPARATUS

(75) Inventors: Jason Tan, Durham, NC (US); Stewart Andrew Bible, Durham, NC (US); Caleb Douglas Triece, Raleigh, NC (US)

(73) Assignee: Fuel Tech, Inc., Warrenville, IL (US)

( * ) Notice: Subject to any disclaimer, the term of this patent is extended or adjusted under 35 U.S.C. 154(b) by 978 days.

(21) Appl. No.: 12/124,878

(22) Filed: May 21, 2008

(65) Prior Publication Data

US 2008/0289714 A1 Nov. 27, 2008

Related U.S. Application Data

(60) Provisional application No. 60/939,637, filed on May 23, 2007, provisional application No. 61/015,884, filed on Dec. 21, 2007.

(51) Int. Cl.
*F15D 1/04* (2006.01)
(52) U.S. Cl. .................... 138/37; 138/39; 96/64; 55/418
(58) Field of Classification Search .................... 138/37, 138/39; 96/64; 55/418
See application file for complete search history.

(56) References Cited

U.S. PATENT DOCUMENTS

| | | | | |
|---|---|---|---|---|
| 1,996,596 A * | 4/1935 | Smith, Jr. | | 138/39 |
| 2,216,046 A * | 9/1940 | Peck | | 138/39 |
| 2,642,792 A | 6/1953 | Reichelderfer | | 454/314 |
| 2,662,553 A * | 12/1953 | Dimmock | | 138/37 |
| 2,735,612 A | 2/1956 | Hausmann | | 415/208.1 |
| 2,911,011 A | 11/1959 | Niehart | | 138/44 |
| 3,351,091 A * | 11/1967 | Chambert | | 137/601.18 |
| 4,213,766 A * | 7/1980 | Wyatt | | 95/78 |
| 4,544,383 A * | 10/1985 | Haselmaker | | 96/64 |
| 4,911,205 A * | 3/1990 | Myers | | 138/39 |
| 5,156,658 A | 10/1992 | Riehl | | 96/64 |
| 5,405,106 A | 4/1995 | Chintamani et al. | | 138/39 X |
| 5,529,092 A * | 6/1996 | Arnoldt | | 138/39 |
| 5,531,484 A * | 7/1996 | Kawano | | 285/179.2 |
| 5,861,585 A | 1/1999 | Van Every et al. | | 181/224 |
| 6,244,300 B1 * | 6/2001 | Pacana | | 138/39 |
| 6,257,155 B1 | 7/2001 | Greene | | 110/163 |
| 6,644,355 B1 | 11/2003 | Gleason | | 138/37 |
| 6,905,658 B2 | 6/2005 | Rogers et al. | | 422/172 |
| 6,923,051 B2 * | 8/2005 | Fleming | | 73/147 |
| 7,303,730 B2 * | 12/2007 | Shishido et al. | | 422/177 |
| 2010/0154911 A1 * | 6/2010 | Yoskowitz | | 138/39 |

OTHER PUBLICATIONS

Sulzer Chemtech. "DeNOx Mixer—Sulzer Mixer-Injector for Selective Catalytic Reduction." Product Brochure, Nov. 10, 2003. Available at: http://www.sulzerchemtech.com/en/PortalData/11/Resources/Brochures/MRT/DeNOx_Mixer.pdf.

* cited by examiner

*Primary Examiner* — Patrick F Brinson
(74) *Attorney, Agent, or Firm* — Thaddius J. Carvis (57) ABSTRACT

An apparatus and method for redirecting fluid flow in a plenum provides flow performance (quality), structural, and economic advantages by using an array of flat blades that is mounted at an angle with respect to the inlet (upstream) fluid flow, such that the blades are tilted with respect to that flow and correspondingly redirect the flow in a desired direction. The apparatus, also referred to as a "GSG" or "graduated straightening grid," has a range of applications, and offers a number of performance, structural, and economic advantages in large-scale applications. As a particular, but non-limiting example, one or more embodiments of the flow-redirecting apparatus taught herein are configured for use in Selective Catalytic Reduction (SCR) systems where catalytic reactors are used for scrubbing industrial flue gases.

25 Claims, 11 Drawing Sheets

DETAIL D

FLOW CONTROL METHOD AND APPARATUS

RELATED APPLICATIONS

This application claims priority under 35 U.S.C. §119(e) from the U.S. provisional patent application filed on 23 May 2007, entitled "Graduated Straightening Grid," and identified by Application No. 60/939,637, and from the U.S. provisional patent application filed on 21 Dec. 2007, entitled "Fluid Flow Control Device," and identified by Application No. 61/015,884, the entire contents of which are incorporated herein by reference.

TECHNICAL FIELD

The present invention relates generally to fluid flow control, and relates particularly to redirecting fluid flow from one direction to another, such as for redirecting flue gas into a Selective Catalytic Reduction (SCR) system.

BACKGROUND

Selective Catalytic Reduction (SCR) systems find wide use in the power generation industry, where they are used for de-nitrification of the flue gas produced in coal-fired power generation. In a common arrangement, flue gas is directed downward through a catalyst layer or bed that is positioned normal to the downward flow of flue gas.

A reagent, such as ammonia, generally is injected into the flow upstream of the catalyst layer, and proper operation of the SCR system depends on achieving uniform flow conditions across the inlet face of the catalyst layer (or layers in a stacked catalyst system). Variances in flow velocity across the face of the catalyst layer impair the desired reaction process and lead to accelerated and uneven depletion of the catalyst layer.

Commonly, flue gas must be redirected for proper entry into an SCR system, which may be formed as a vertical enclosure. For example, flue gas may be horizontally ducted through a plenum into a top inlet of the vertical enclosure, and downwardly redirected into the enclosure. Without flow management provisions, such redirection causes flow disturbances and results in unbalanced flow conditions on the inlet face of the catalyst layer(s). A number of known flow redirecting devices find use in flue gas applications.

For example, U.S. Pat. No. 6,905,658 B2 to Rogers et al., discloses a device for redirecting flue gas via channeling. More particularly, the '658 patent teaches the formation of separate flow channels within a flue, for flow redirection and conditioning. Other known flow redirecting devices include turning vanes disposed within ductwork corners or at other junctions. Turning vanes offer good performance potential, but come at the expense of additional design, installation, and maintenance cost/complexity, given their curved shapes and other aerodynamic considerations.

As an alternative to controlled redirecting devices, it is also known to place flow conditioning devices downstream from redirection points, e.g., downstream from ducting corners. So-called rectifier or straightening grids represent a known example of downstream flow conditioning devices. A common straightening grid configuration involves placing a grid of parallel or crisscrossing blades edgewise in the redirected flow, to smooth the flow passing through the grid.

Further, in applications requiring very high flow quality—i.e., tight cross-sectional uniformity of flow velocity—it is known to use redirecting devices in combination with downstream conditioning devices. For example, turning vanes or very widely spaced blade systems may be mounted in a duct corner for controlled flow redirection, and a downstream straightening grid may be suspended within the redirect flow for further flow conditioning. While such combined arrangements are known to achieve potentially high flow quality, they can be disadvantageous in terms of cost and installation complexity. Additionally, practical constraints, such as plenum length, size, etc., may prevent or make impractical the use of both turning devices in combination with straightening grids to achieve high flow quality.

SUMMARY

An apparatus for redirecting fluid flow in a plenum provides flow performance (quality), structural, and economic advantages by using an array of flat blades that is mounted at an angle with respect to the inlet (upstream) fluid flow, such that the blades are tilted with respect to that flow and correspondingly redirect the flow in a desired direction. The apparatus, also referred to as a "GSG" or "graduated straightening grid," has a range of applications, and offers a number of performance, structural, and economic advantages in large-scale applications. As a particular, but non-limiting example, one or more embodiments of the flow-redirecting apparatus taught herein are configured for use in Selective Catalytic Reduction (SCR) systems where catalytic reactors are used for scrubbing industrial flue gases.

In at least one embodiment, an apparatus for redirecting fluid flow in a plenum from a first flow direction to a second flow direction comprises a transverse array of flat blades positioned at an angle oblique to the first flow direction to redirect the fluid flow from the first flow direction to the second flow direction. In this sense, "transverse" denotes that the blades are lengthwise transverse to the direction of the flow being redirected. The oblique angle thus presents an inclined, graduated surface to the inlet/upstream flow, such that the windward face of each blade in the array redirects a portion of the flow in the desired direction. Such an arrangement may be implemented using a spacing between blades in the transverse array that is about W/30 or less, where W is a plenum width at an outlet side of the transverse array.

In another embodiment, a method of designing a transverse array of flat blades for use in redirecting fluid flow in a plenum from a first flow direction to a second flow direction comprises defining a transverse blade length as a function of an interior cross section at a position within the plenum where the transverse array is to be mounted, and adjusting at least one of a blade height, blade spacing, and blade angle as needed to achieve a desired flow quality for the fluid flow. The method may include setting or otherwise adjusting the blade spacing to be about W/30 or less. The method also can include adjusting the blade angle by adjusting a planned mounting angle of the transverse array within the plenum.

In one or more such embodiments, adjusting at least one of a blade height, blade spacing, and blade angle as needed to achieve a desired flow quality for the fluid flow comprises simulating fluid flow in a simulation model of the transverse array, assessing a modeled flow quality against one or more quality requirements, and adjusting one or more of a modeled blade height, modeled blade spacing, and modeled blade angle until the modeled flow quality meets the one or more flow quality requirements. Such processing may be automated partially or wholly, such as by configuring a simulation model with design requirements and designating preferred design tradeoffs (such as blade height-to-spacing adjustment ranges), and configuring the simulation to tune the array design against flow quality requirements. The design requirements may include structural details, including dimensions, allowable array weights, structural fastening/support details, stiffness, etc.

Of course, those skilled in the art will recognize additional features and advantages upon reading the following detailed description, and upon viewing the accompanying drawings.

DETAILED DESCRIPTION

Figure 1:
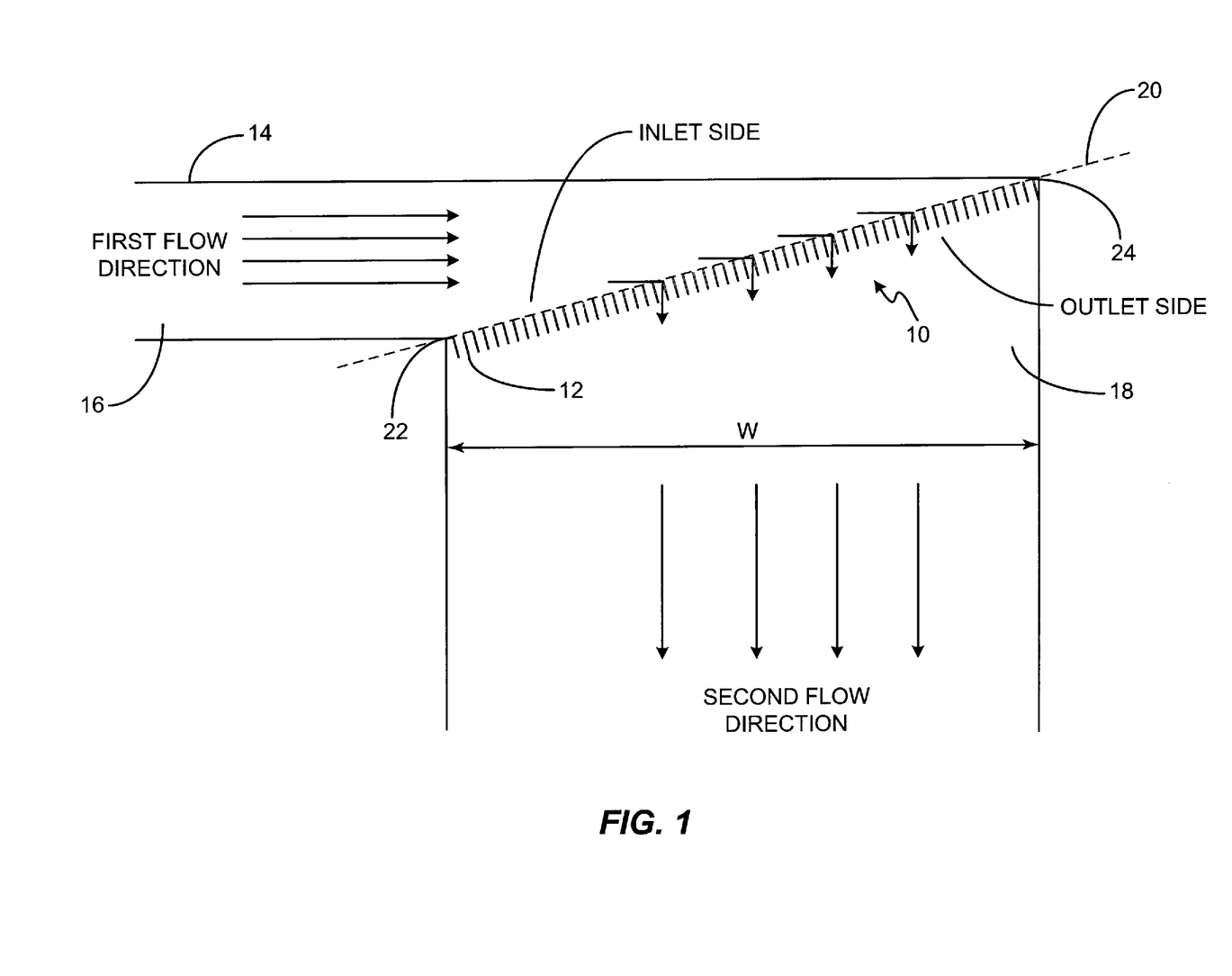
FIG. 1 is a simplified side view of one embodiment of a transverse array for flow redirection, shown within a plenum.

FIG. 1 illustrates a transverse array 10, which is also referred to as a "graduated straightening grid" or simply as "array 10." From the illustration, one sees that the array 10 comprises a plurality of spaced-apart flat blades 12. The array 10 is configured for fixed mounting within a plenum 14, for redirecting a fluid flow from a first flow direction to a second flow direction. In particular, it should be appreciated that the illustrated, novel arrangement for redirecting the fluid flow provides high downstream flow quality in the second flow direction, without need for supplemental straightening vanes downstream of the array 10.

The illustration depicts a side view of the array 10 and it will be appreciated that the viewer sees an "end view" of the blades 12, and that the blades 12 are lengthwise (end-to-end) oriented transverse to the first flow direction. Further, as shown in the illustration, one example installation of the array 10 is at a corner position or junction of the plenum 14, where a first plenum section 16 is oriented in the first flow direction and a second plenum section 18 is oriented in the second flow direction. Thus, the array 10 in this example is configured for redirecting the fluid flow at the corner junction between first and second plenum sections 16 and 18.

In one or more embodiments, the plenum 14 and array 10, including the first and second plenum sections 16 and 18, form a plenum system, such as may be used for directing flue gas, e.g., from a boiler, into a Selective Catalytic Reduction (SCR) system. In such a plenum system, the plenum 14 has a first plenum section 16 for carrying a fluid flow in a first flow direction and a second plenum section 18 for carrying the fluid flow in a second flow direction. Further, the plenum system includes an array 10 of parallel, spaced-apart flat blades 12 that are lengthwise transverse to the first flow direction, i.e., the array 10. Here, the array 10 is positioned within the plenum 14 at a junction between the first and second plenum sections 16 and 18, and is configured to redirect the fluid flow from the first flow direction to the second flow direction, based on being tilted at an oblique angle relative to the first flow direction. With the illustrated tilt, a top portion of each flat blade 12 in the array 10 catches and redirects a portion of the fluid flow from the first direction to the second flow direction.

A corresponding method of redirecting a fluid flow in a plenum system, for example, may be practiced by a power generation system operator. In one embodiment, such a method comprises maintaining an array 10 of parallel, spaced-apart flat blades 12 at a junction between a first plenum section 16 for carrying a fluid flow in a first flow direction and a second plenum section 18 for carrying the fluid flow in a second flow direction. The parallel, flat blades 12 in the array 10 being lengthwise transverse to the first flow direction and said array 10 being tilted at an oblique angle relative to the first flow direction. Here, "maintaining" the array 10 as describe denotes, without limitation, the act of fixing the array 10 within a plenum 14, or keeping the array 10 so fixed. The method further includes directing a fluid flow flowing in the first flow direction in the first plenum section 16 against the array 10, thereby causing the fluid flow to be redirected into the second plenum section in the second flow direction.

Broadly, one sees that an exemplary oblique angle for mounting the array 10 with respect to the first flow direction is the "corner angle" of the corner junction between plenum sections 16 and 18. One sees that the upstream blade edges of the blades 12 define a plane and, in at least some design applications, it is preferred to align that plane along the corner diagonal line 20 running from the inside plenum corner 22 to the outside plenum corner 24. In this preferred form, as well as others, the array 10 is tilted at an oblique angle to the flow direction and a plane defined by the upstream blade edges is positioned diagonally with the plenum to intersect both the first and second flow directions.

Of course, it should be understood that other alignments may be used, and the array 10 can be raised or lowered relative to the corner centerline as a "tuning" parameter for achieving desired flow quality, mounting convenience, etc. Further, the angle of the array 10 relative to the first flow direction may be increased or decreased as a performance tuning parameter, and the oblique angle thus does not necessarily track inside-to-outside corner angles. Still further, it should be understood that the array 10 may be configured for directional changes other than 90 degrees, e.g., corners at less than 90 degrees, and the mounting angles and corner positioning can be varied as needed for flow quality and mechanical considerations.

Figure 2:
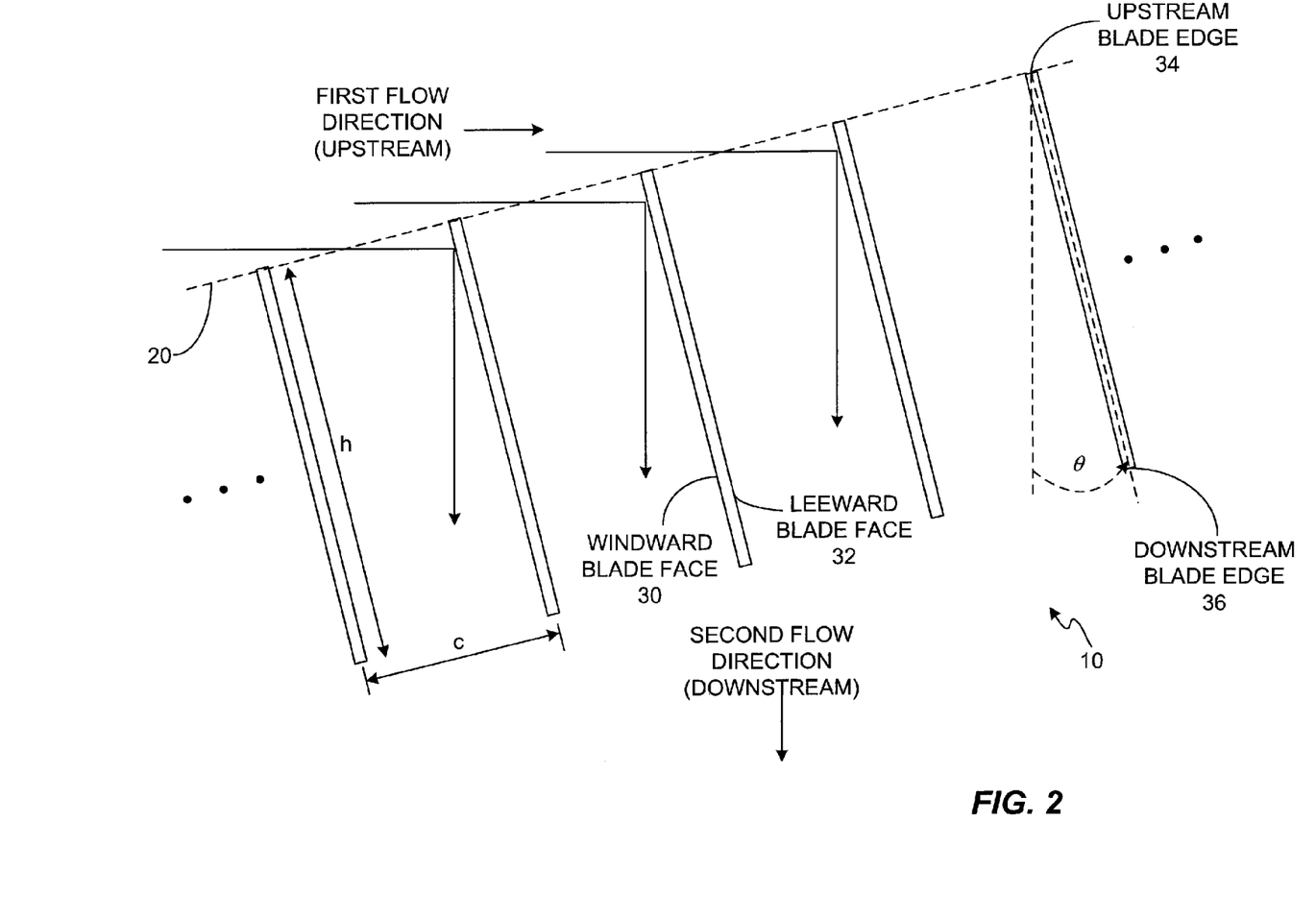
FIG. 2 is a simplified side view of blade details for one or more embodiments of the array shown in FIG. 1.

Turning to FIG. 2, one sees a magnified side view of a few blades 12 comprising a given embodiment of the array 10. In particular, for ease of reference rather than limitation, one sees that the transverse faces of each blade 12 can be identified as a windward face 30 that faces looking into the fluid flowing in the first flow direction and an opposite, leeward face 32. For further reference, each blade 12 is considered to have an upstream (transverse) edge 34 associated with the inlet/upstream first flow direction and a downstream (transverse edge) 36 associated with the outlet/downstream second flow direction. These upstream and downstream blade edges 34 and 36 may or may not be machined or formed into an aerodynamic profile. Indeed, unfinished square edges such as those associated with plate steel generally provide acceptable performance. However, some installations having higher flow rates, thicker blades, etc., may benefit from shaped blade edges.

In overall respect to array configurations, one or more embodiments of the array 10 are based on a blade height "h" as measured from the upstream blade edge 34 to the downstream blade edge 36 being in a range from about six inches to about eighteen inches, and a blade spacing "c" between adjacent blades 12 in the array 10 being in a range from about three inches to about twenty-four inches. Further, the oblique angle—mounting angle of the array 10 relative to the first flow direction—may be selected to place the blades 12 in the array 10 at a blade angle θ in a range from about minus twenty-five degrees to about plus twenty-five degrees.

Of course, whether the parameters are set within the above ranges, it should be understood that the array 10 may be "tuned" as needed for given installation requirements by adjusting one or more such parameters. Such tuning may fix one or more such parameters and vary one or more others in an iterative fashion to arrive at a design solution that yields acceptable flow quality, while meeting all practical cost and mechanical considerations.

In at least one embodiment, a preferred blade height "h" is at or about twelve inches, and a preferred blade spacing "c" is at or about six inches, and a preferred blade angle θ is at or about nineteen degrees. (One sees in FIG. 2 that the blade angle is measured between a line running from upstream blade edge 34 to downstream blade edge 36 and a line parallel with the second flow direction. Thus, if the second flow direction is vertical, then the preferred blade angle is at or about nineteen degrees off of the vertical. More broadly, the oblique angle of the array 10 is selected to position each blade 12 in the array 10 at a blade angle θ of between −25 degrees to +25 degrees (inclusive) with respect to the second flow direction, wherein the blade angle θ is, as explained, measured relative to the second flow direction using a line connecting the upstream and downstream blade edges 34 and 36.

Further regarding array design considerations, in one embodiment the blade height as measured from the upstream blade edge 34 to the downstream blade edge 36 and is configured to be about two times the blade spacing as measured between adjacent blades 12 in the array 10. Mathematically, h=2c. In another embodiment, the ratio is set to 2.5 times, i.e., h=2.5c. For at least some installations, the 2× ratio is preferred, but it should be understood that the height-to-spacing ratio is a candidate tuning parameter and may be manipulated as part of the array design process. For example, weight and/or cost restrictions may call for a reduced blade count, meaning that blade spacing increases for given array dimensions. In such cases, for example, the overall array mounting angle can be changed and/or the blade height can be changed to compensate for the reduced blade count.

Figure 3:
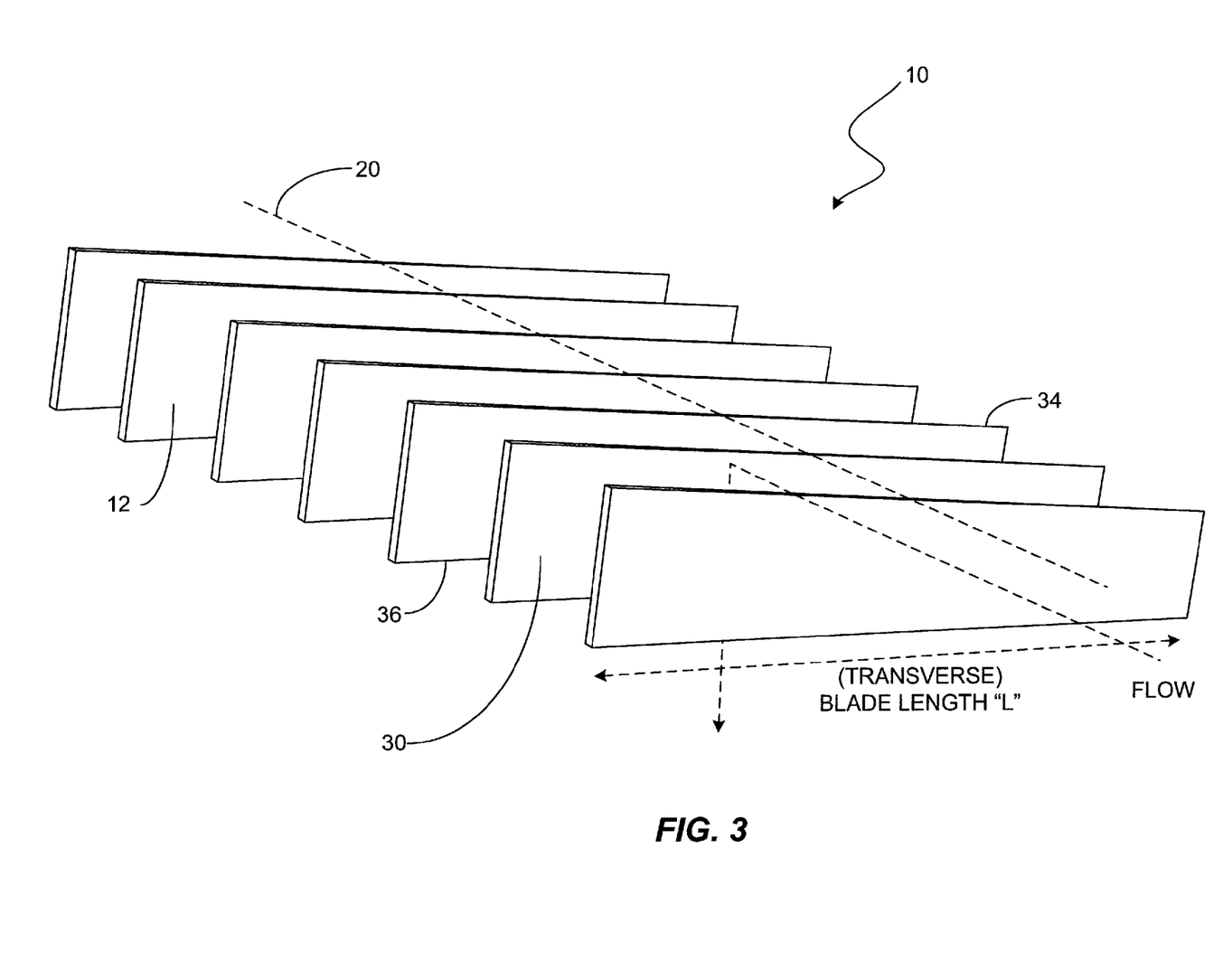
FIG. 3 is a simplified perspective view of one embodiment of a transverse array, particularly illustrating the flat blades used for flow redirection.

Turning to FIG. 3, one sees a simplified perspective view of the blades 12 in a given array 10, emphasizing the lengthwise transverse orientation of the blades 12, and further illustrating the deflection by the windward blade faces 30 of the flowing fluid from the first flow direction to the second flow direction. While the leeward face 32 is not visible in FIG. 3, one or more embodiments contemplated herein include a structural stiffener integrated or otherwise mounted on the leeward faces 32 of the blade 12. (Such structural stiffening is shown later herein, for a large scale SCR application.)

As for other mechanical and structural considerations, one should note that the term "plenum" is to be given broad construction herein. For example, the definition contemplated herein encompasses but is not limited to a fluid-filled space in a structure (e.g., gas, air, etc.), and particularly a conduit or other passage carrying a flowing fluid. Further, unless otherwise noted, the term does not necessarily connote a continuous conduit. For example, a first closed structure (e.g., conduit) may open into a second closed structure (e.g., the space above an SCR stack), and all or part of the first and second structures may be considered as the plenum 14 in which the array 10 is mounted.

Figure 4:
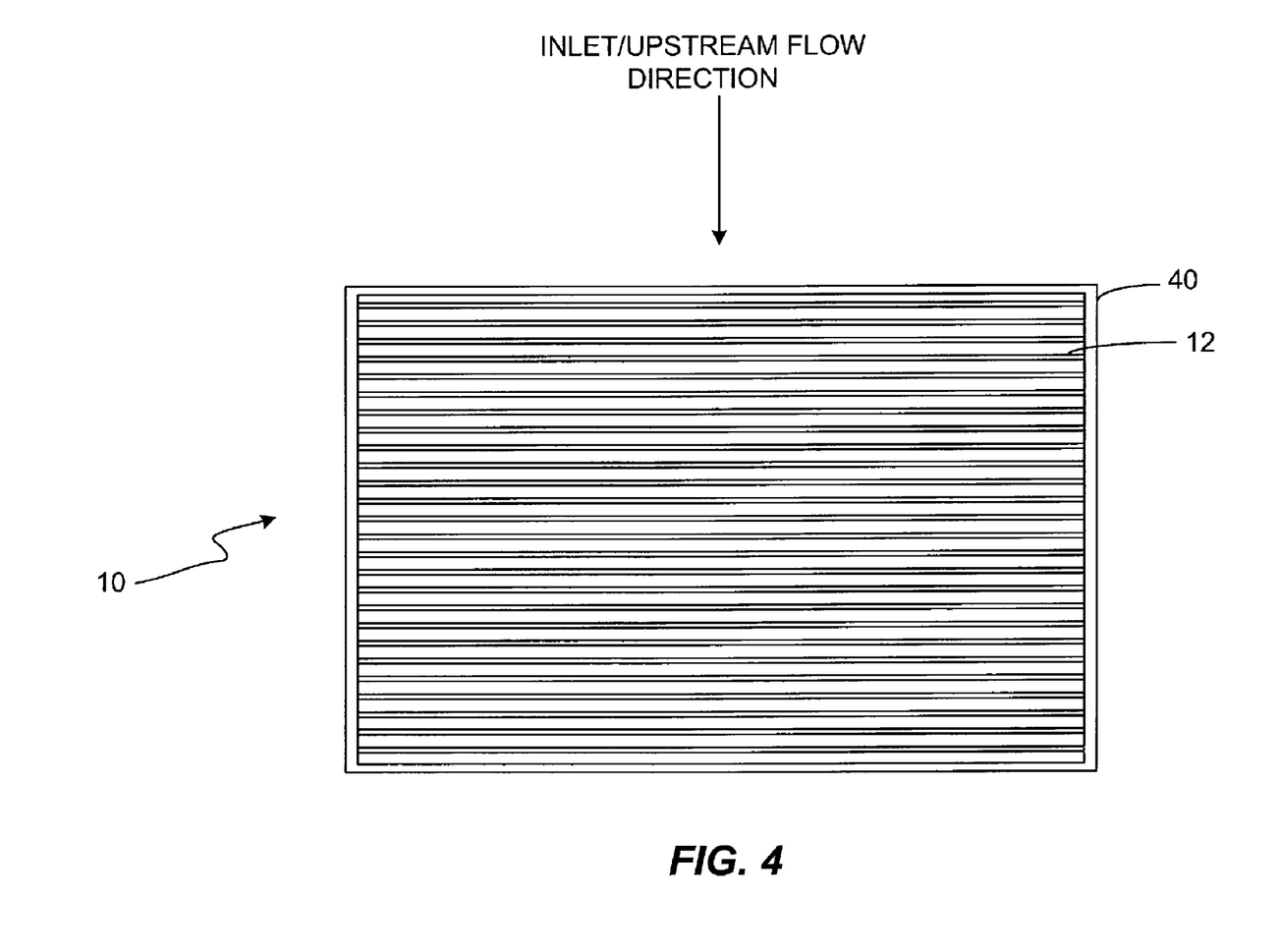
FIG. 4 is a simplified plan view of one embodiment of a transverse array.
Figure 5:
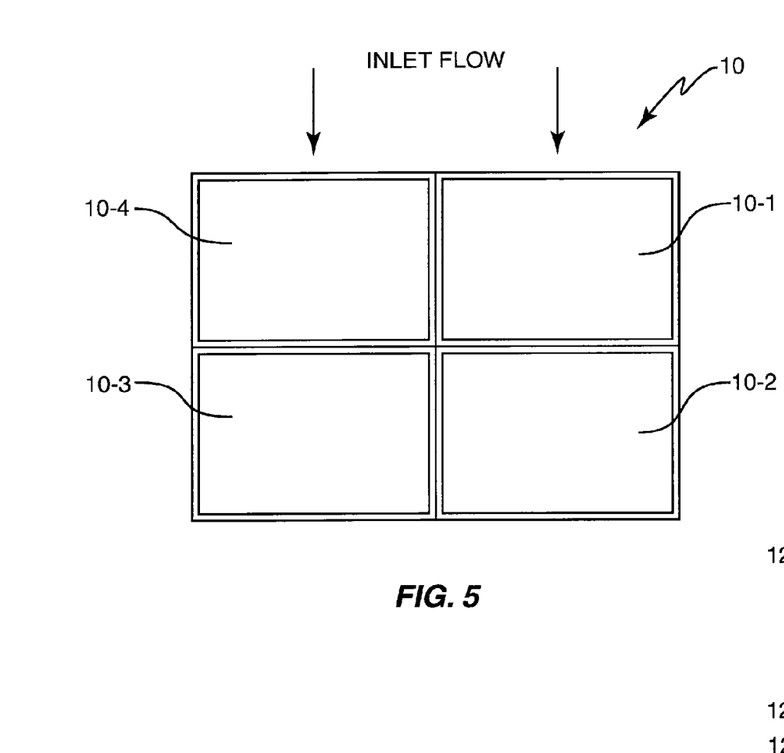
FIG. 5 is a plan view of an array formed from multiple sub-arrays.

Further, it should be understood that mounting features of the array 10 may be tailored as needed to the particulars of the plenum 14 in which it is installed. For example, FIG. 4 depicts a plan view of a given array 10, illustrating not only the transverse orientation of the blades 12, but also showing a perimeter frame 40, which serves as a carrier for the blades 12 and which may be used to fix the array 10 within the plenum 14. Thus, in one or more embodiments, the array 10 includes at least a partial perimeter frame 40 for structurally fixing the array 10 within the plenum 14. Also, it should be understood that the array 10 may comprise two or more sub-arrays. For example, for very large plenum cross-sections, a number of smaller arrays 10 may be used to form a larger array spanning the required interior space. Doing so may provide, for example, greater structural integrity, as well as limiting individual blade lengths to more practical values. FIG. 5 illustrates an example of an array 10 formed from multiple smaller arrays, labeled as arrays 10-1 through 10-4.

Figure 6:
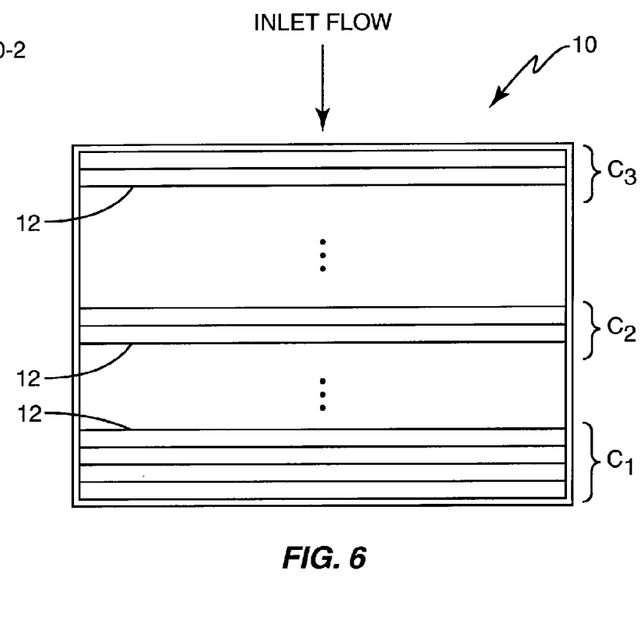
FIG. 6 is a plan view of an array having non-uniform blade spacing.

Still further, it should be understood that the blades 12 are uniformly spaced within the array 10 in one or more embodiments. However, in one or more other embodiments, the blades 12 are non-uniformly spaced within the array 10. In still other embodiments, a portion of the blades 12 may be uniformly spaced and another portion may be non-uniformly spaced. Such variations may be adopted to allow for structural mounts, to accommodate obstructions, etc. FIG. 6 illustrates non-uniform blade spacing $c_1$, $c_2$, and $c_3$, in different regions of the array 10. One might, for example, use a closer blade spacing $c_1$ at the back region of the array 10 (furthest away relative to the inlet flow direction), than is used in the middle region of the array 10, where a larger spacing $c_2$ might be used. The spacing $c_3$ at the leading region of the array 10 may be the same as $c_1$, or smaller or greater than $c_1$. Indeed, the spacing used across the overall depth of the array 10 can be varied for example as needed, to tailor flow redirection characteristics and/or to accommodate mechanical requirements of the plenum.

Of course, all design parameters can be set and adjusted as needed for a given installation. With respect to FIG. 4, for example, one or more embodiments of the teachings presented herein provide for advantageous determination of blade height "h" and blade spacing "c" (as shown in FIG. 2). For example, in one preferred embodiment, the array 10 is implemented using a blade height of h=12 inches, with a blade spacing c=6 inches. This arrangement provides high-quality flow redirection over a fairly wide range of plenum dimensions. For example, one may advantageously use these preferred dimensions for plenum widths W of around 40 feet at an outlet side of the array 10—see, e.g., the illustration of the dimension W in FIG. 1. Of course, these preferred h and c dimensions can be used for other values W beyond 40 feet, and may offer suitable performance in those extended applications, depending on inlet flow rates and flow quality requirements, among other things.

In terms of preferred design ratios, which may serve as design parameter bounds in programmatic array design as taught herein, the blade spacing c used for the array 10 may be about W/30 or less. Thus, an automated design approach may set the blade spacing maximum bound at W/30, where the numeric value of W is taken from the given plenum design, and then adjust the spacing as needed to achieve the flow performance and mechanical design objectives. Thus, in at least one embodiment, $c_{max}=W/30$, or $c \leq W/30$.

Similarly, an advantageous minimum blade height may be determined as 0.6 times the blade spacing, which may be expressed as $h_{min}=0.6 \cdot c$. Exemplary performance has been observed using a blade spacing of $c=W/70$, and a blade height of $h=2 \cdot (W/70)$. In one preferred embodiment, the array 10 uses a blade height of twelve inches, a blade spacing of six inches, and a blade angle of nineteen degrees. Of course, any or all of these parameters may be tuned individually or jointly, for a given application. Further points of variation or tuning including implementing the array 10 without or without aerodynamically formed or machined blades 12, The array angle and height—positioning along the corner diagonal line—represent further tunable parameters.

With these advantageous dimensional and positioning relationships in mind, one aspect of the teachings herein comprises a design methodology whereby computer simulation (and/or experimental scale modeling) and parameter adjustment yield an array 10 that is configured given particular installation requirements. Such simulation may be based on computational fluid dynamics (CFD) modeling and/or experimental scale modeling, and may be implemented in whole or in part on a computer system, e.g., a PC, having a computer readable medium embodying program instructions for carrying out the array tuning method within a flow simulation environment.

Figure 7:
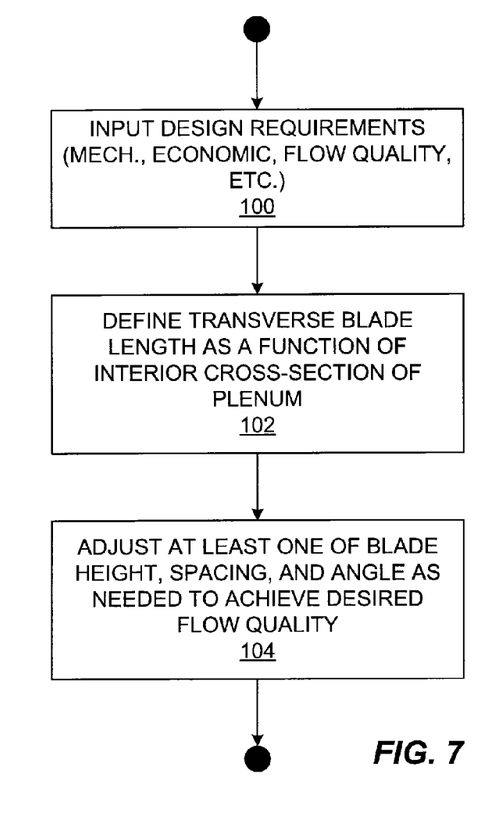
FIGS. 7 and 8 are logic flow diagrams illustrating processing logic such as may be implemented on a computer system, for one or more embodiments of a method of designing a transverse array for flow redirecting.

FIG. 7 illustrates one embodiment of such a method, wherein processing "begins" with inputting design requirements (Block 100). Such requirements may be desired flow quality in the second direction, which may be expressed in terms of flow quality (flow straightness and uniformity), turbulence values, etc. Such requirements generally will include basic plenum dimensions, flow volumes, velocities, etc. With basic design requirements in place, a method of designing the array 10 includes defining a transverse blade length "L" as a function of an interior plenum cross section at a position within the plenum 14 where the array 10 is to be mounted (Block 102). Processing continues with adjusting at least one of a blade height, blade spacing, and blade angle as needed to achieve a desired flow quality for the fluid flow (Block 104).

For example, a programmatic solution may derive a nominal or preferred default blade spacing c as W/30, where W is an entered dimension taken from the plenum design at hand, and correspondingly set the nominal or preferred default blade height h to $h=2 \cdot (W/30)$. Adjustments to one or both the spacing and height values may be made, starting with those default settings, or starting from default value spacing and height values set in view of the $c \leq W/30$ and $h \geq 0.6 \cdot c$, or otherwise programmatically bounded by those values.

Such processing may be iterative and may use or be driven by scripts or other programmatic controls that step through a range of design parameter choices for any one or more array tuning parameters (e.g., blade height, spacing, angle, overall blade count, etc.), until the design requirements are met. Again, such processing may be carried out via computer simulation in a flow modeling simulation environment or in experimental scale modeling.

Figure 8:
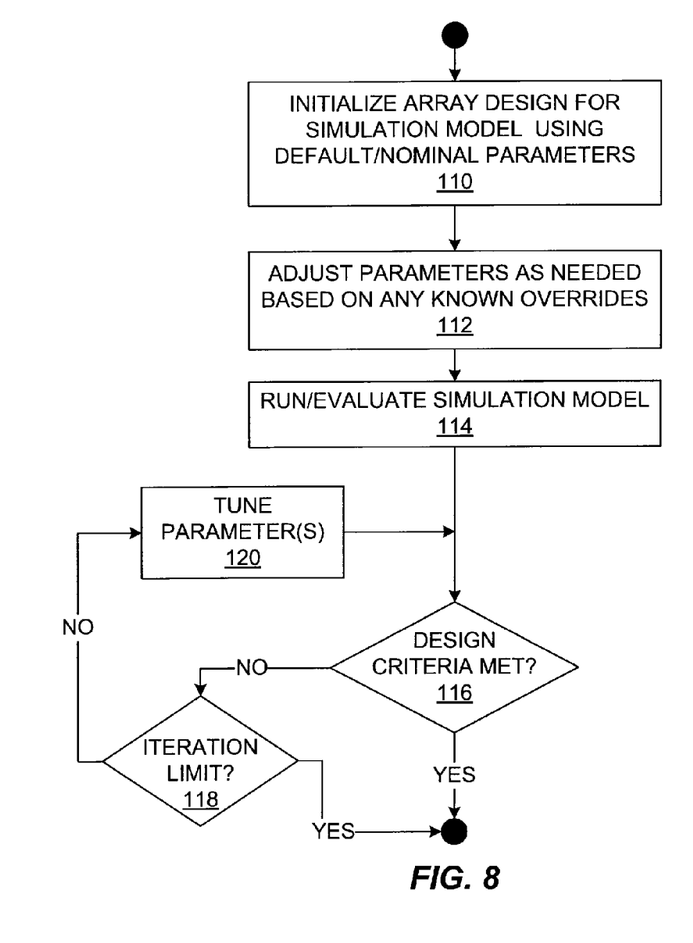

FIG. 8 illustrates one embodiment of iterative array tuning. Such processing may represent details for Block 104 of FIG. 7. The array design may be initialized using default or nominal array parameters, such as default blade height, spacing, and angle (Block 110). Processing continues with adjusting any one or more parameters based on known overrides, such as a mandated blade spacing (Block 112). Processing continues with running/evaluating the corresponding simulation model (Block 114).

Evaluation comprises, for example, comparing the simulated flow qualities against design requirements. If design criteria are met (within some acceptable range of variations) (Block 116), processing "ends." If design criteria are not met, and if an iteration limit or other processing constraint is not exceeded (Block 118), processing continues with tuning one or more array parameters and re-running/re-evaluating the re-tuned simulation model (Block 120). Such iterative tuning continues as needed or until an iteration constraint is exceeded.

In one or more embodiments, tuning the array 10 includes adjusting the blade angle by adjusting a planned mounting angle of the array 10 within the plenum 14. Tuning alternatively or additionally includes adjusting at least one of a blade height, blade spacing, and blade angle as needed to achieve a desired flow quality for the fluid flow. Again, such tuning may comprise simulating fluid flow in a simulation model of the array 10, assessing a modeled flow quality against one or more quality requirements, and adjusting one or more of a modeled blade height, modeled blade spacing, and modeled blade angle until the modeled flow quality meets the one or more flow quality requirements. Also, as noted, adjusting at least one of a blade height, blade spacing, and blade angle as needed to achieve a desired flow quality for the fluid flow may include initializing a transverse array design using a default blade height, a default blade spacing, and a default blade angle, and then adjusting one or more of those default values.

Such defaults may be based on setting the default blade height and the default blade spacing according to a blade height to blade spacing ratio of about two-to-one. Further, the tuning ranges of one or more tuning variables may be constrained to lie in the earlier mentioned ranges for blade height, spacing, and angle.

Figure 9:
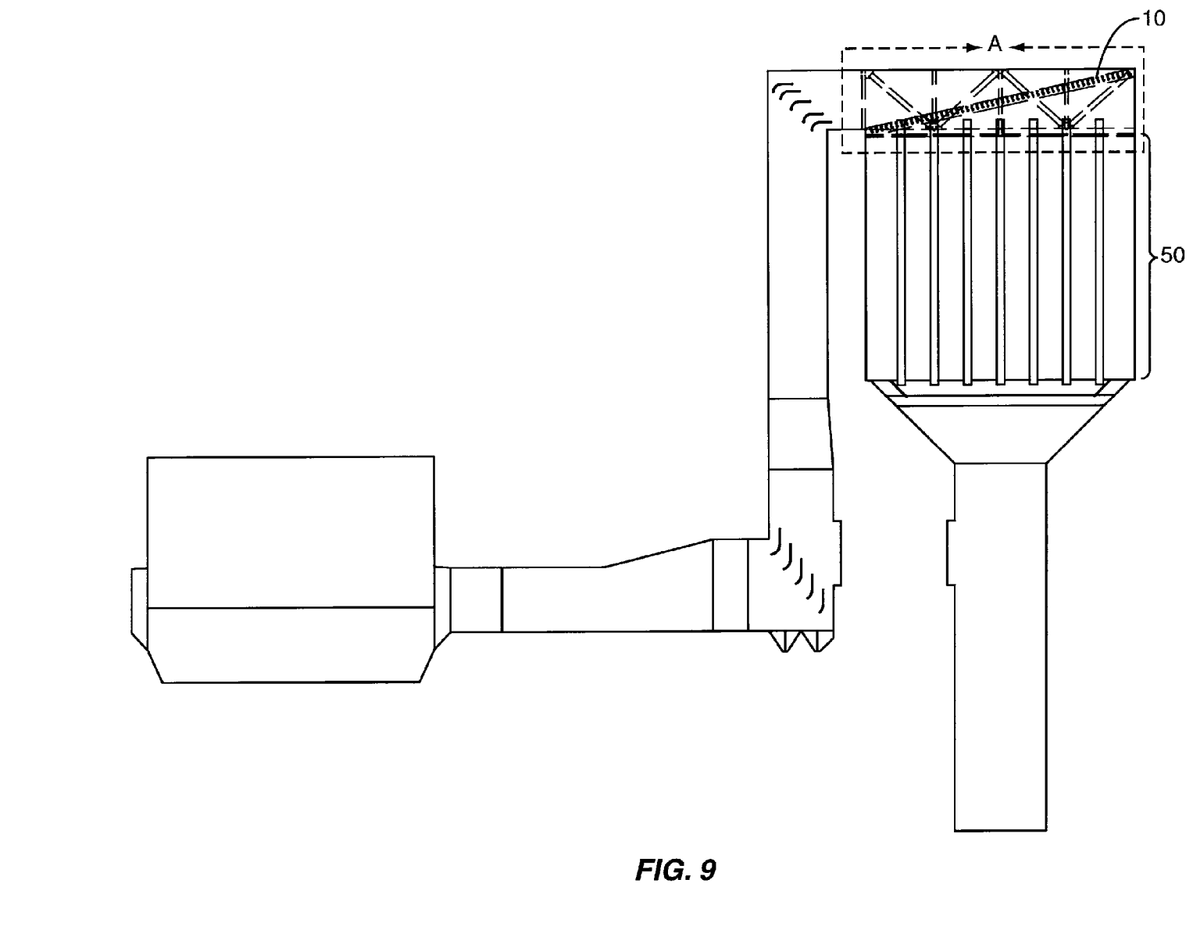
FIG. 9 is a simplified diagram of one embodiment of a transverse array as taught herein, installed as part of plenum system directing/redirecting flue gas into a selective catalytic reduction (SCR) system.
Figure 10:
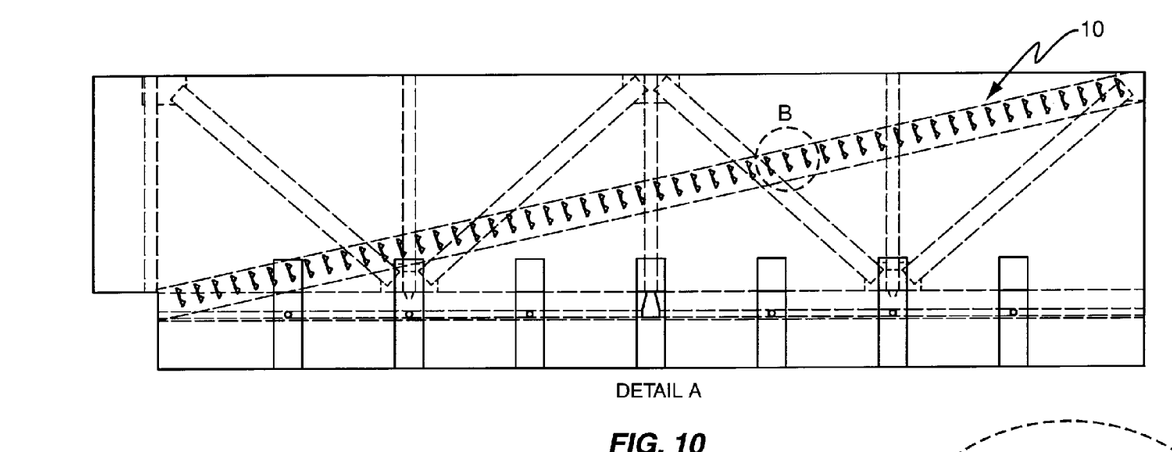
FIGS. 10 and 11 are diagrams of example details for the SCR system of FIG. 9.
Figure 11:
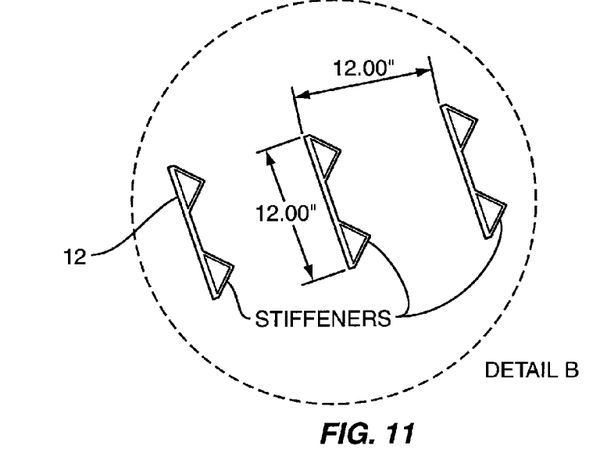
Figure 12:
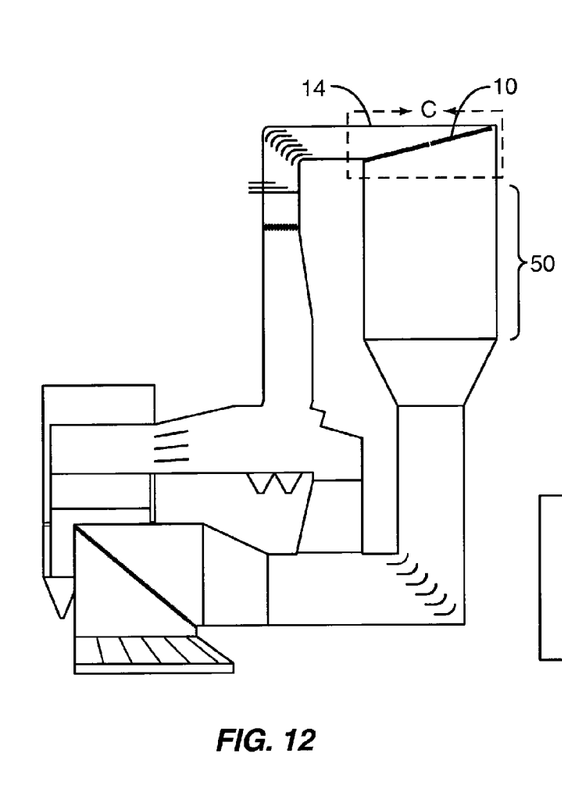
FIG. 12 is a simplified diagram of another embodiment of a transverse array as taught herein, installed as part of plenum system directing/redirecting flue gas into an SCR system.
Figure 13:
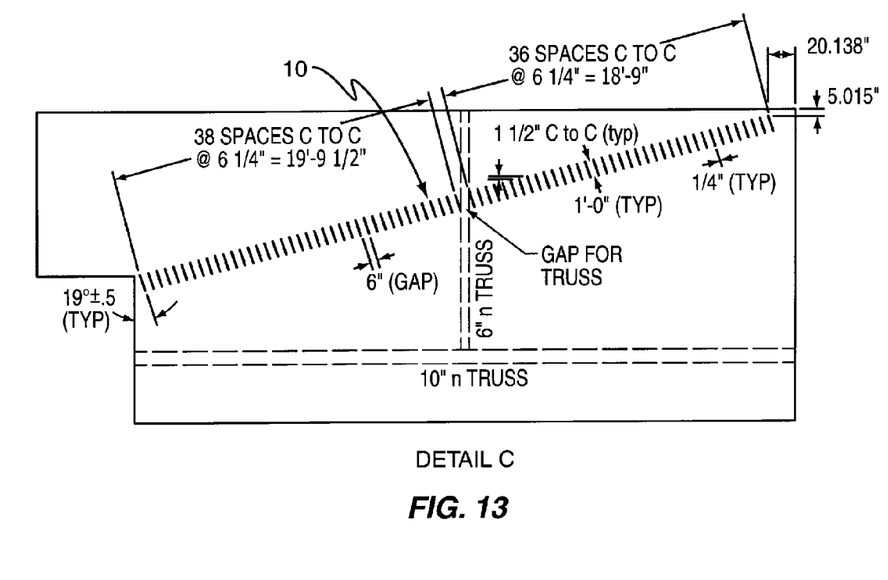
FIG. 13 is diagram of example details for the SCR system of FIG. 12.
Figure 14:
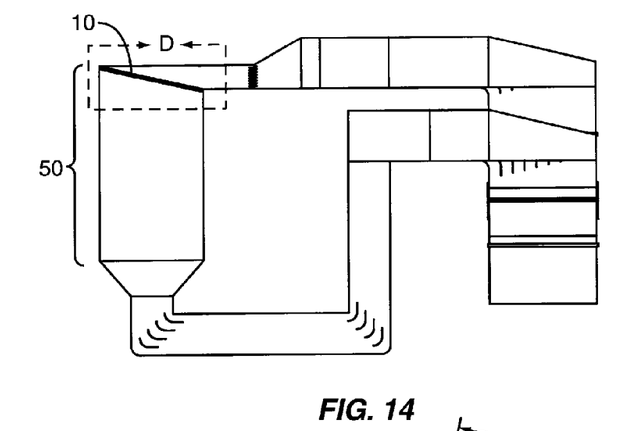
FIG. 14 is a simplified diagram of another embodiment of a transverse array as taught herein, installed as part of plenum system directing/redirecting flue gas into an SCR system.
Figure 15:
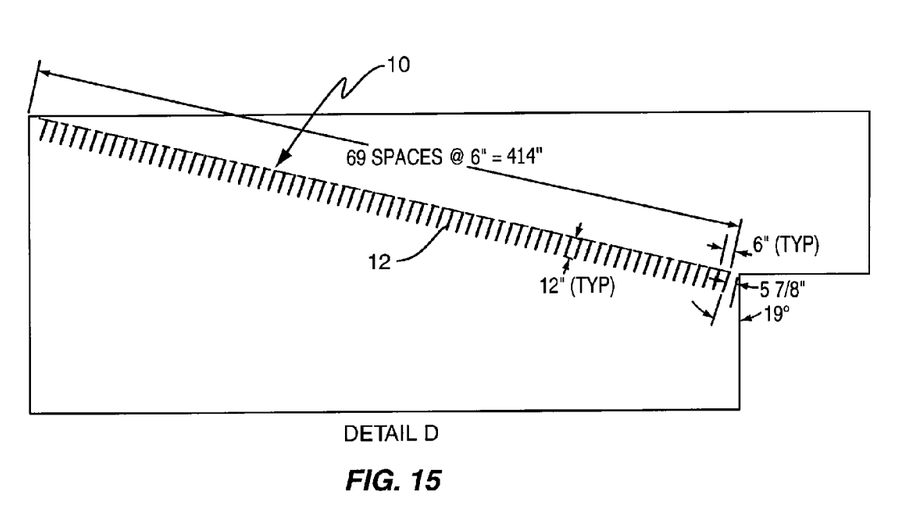
FIG. 15 is diagram of example details for the SCR system of FIG. 14.
Figure 16:
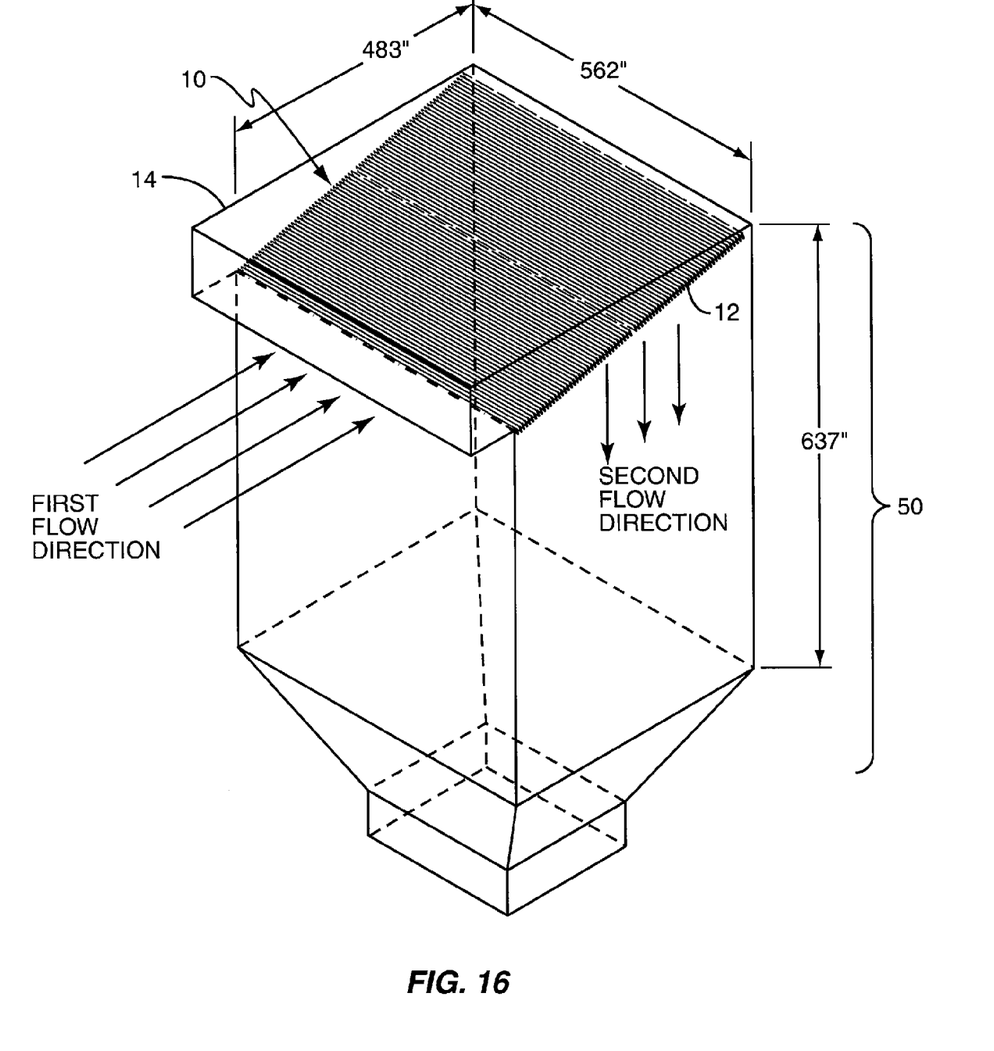
FIG. 16 is a simplified diagram of another embodiment of a transverse array as taught herein, installed as part of plenum system directing/redirecting flue gas into an SCR system.

With such design flexibility in mind, FIG. 9 illustrates an example application where an embodiment of the array 10 is configured in a plenum system, for redirecting flue gas into an SCR system 50. FIG. 10 illustrates example grid/blade dimensioning details, while FIG. 11 highlights leeward side structural stiffeners on the blades 12, and illustrates mechanical mounting features. Further, FIG. 12 illustrates another SCR system 50, and FIG. 13 illustrates corresponding example dimensioning details for the array 10. Likewise, FIG. 14 illustrates another SCR system 50, and FIG. 15 illustrates corresponding example dimensioning details. Finally, FIG. 16 illustrates another plenum system, including array 10, and provides non-limiting example dimensions for the illustrated SCR system 50.

However, the array 10 is not limited to these illustrated examples. More generally, it should be understood that the foregoing description and the accompanying drawings represent non-limiting examples of the methods, systems, and individual apparatuses taught herein. As such, the present invention is not limited by the foregoing description and accompanying drawings. Instead, the present invention is limited only by the following claims and their legal equivalents.

What is claimed is:

1. A plenum system of an apparatus for selective catalytic NO$_x$ reduction, said apparatus effective for redirecting fluid flow comprising:
a plenum having a first plenum section for carrying a fluid flow in a first flow direction and a second plenum section for carrying the fluid flow in a second flow direction; and an
array of parallel, spaced-apart flat blades that are lengthwise transverse to the first flow direction, said array positioned within the plenum at a junction between the first and second plenum sections and configured to redirect the fluid flow from the first direction to the second direction based on being tilted at an oblique angle relative to the first flow direction such that the blades are at an angle of from 15 to 25° relative to the second flow direction and a top portion of each flat blade catches and redirects a portion of the fluid flow from the first direction to the second flow direction;
wherein upstream blade edges define a plane positioned diagonally with the plenum to intersect both the first and second flow directions; and
wherein the array is adjustable within said plenum and is configured with a blade spacing of about W/30 or less, where W is a width of the second plenum section measured in the first flow direction at an outlet side of the array.

2. A method of redirecting a fluid flow in a plenum system comprising: maintaining an array of parallel, spaced-apart flat blades at a junction between a first plenum section adjustable within said plenum system, for carrying a fluid flow in a first flow direction and a second plenum section for carrying the fluid flow in a second flow direction, said parallel, flat blades in the array being lengthwise transverse to the first flow direction and said array being tilted at an oblique angle relative to the first flow direction such that the blades are at an angle of from 15 to 25° relative to the second flow direction and upstream blade edges define a plane positioned diagonally with the plenum to intersect both the first and second flow directions, and wherein a blade spacing between adjacent blades in the array is about W/30 or less, where W is a width of the second plenum section measured in the first flow direction at an outlet side of the array; and directing a fluid flow flowing in first plenum section in the first flow direction against the array, thereby causing the fluid flow to be redirected into the second plenum section in the second flow direction.

3. An apparatus for redirecting fluid flow in a plenum from a first flow direction to a second flow direction, said apparatus comprising a transverse array of flat blades adjustable within said plenum and positioned at an angle oblique to the first flow direction to redirect the fluid flow from the first flow direction to the second flow direction such that the blades are at an angle of from 15 to 25° relative to the second flow direction and upstream blade edges define a plane positioned diagonally with the plenum to intersect both the first and second flow directions, and wherein a blade spacing between adjacent blades in the transverse array is about W/30 or less, where W is a plenum width measured in the first flow direction at an outlet side of the transverse array.

4. The apparatus of claim 3, wherein the apparatus is configured for redirecting the fluid flow at a corner junction between first and second plenum sections, said first plenum section conveying the fluid flow in the first flow direction and said second plenum section conveying the fluid flow in the second flow direction, and wherein a plane defined by the transverse array is aligned along a diagonal line of the corner junction.

5. The apparatus of claim 4, wherein the plane is defined by upstream edges of the blades in the transverse array and wherein the oblique angle represents a measure of the angle between the first flow direction and the plane.

6. The apparatus of claim 5, wherein the transverse array is positioned with the plane aligned on a diagonal line extending from inside to outside corners of the corner junction.

7. The apparatus of claim 5, wherein a blade height as measured from an upstream blade edge to a downstream blade edge is in a range from about six inches to about eighteen inches, and wherein the oblique angle is selected to place the blades in the transverse array at a blade angle in a range from about fifteen degrees to about twenty-five degrees.

8. The apparatus of claim 7, wherein the blade height is at or about twelve inches, the blade spacing is at or about six inches, and the blade angle is at or about nineteen degrees.

9. The apparatus of claim 3, wherein a blade height as measured from an upstream blade edge to a downstream blade edge is configured to be about two times the blade spacing as measured between adjacent blades in the transverse array.

10. The apparatus of claim 9, wherein the oblique angle is selected to position each blade in the transverse array at a blade angle of between minus twenty-five degrees and plus twenty-five degrees with respect to the second flow direction, wherein the blade angle is measured relative to the second flow direction using a line connecting the upstream and downstream blade edges.

11. The apparatus of claim 3, wherein one or more of the blades includes a structural stiffener integrated or otherwise mounted on a leeward face of the blade, wherein the leeward face of the blade is the side of the blade away from the first flow direction.

12. The apparatus of claim 3, wherein the transverse array includes at least a partial perimeter frame for structurally fixing the transverse array within the plenum.

13. The apparatus of claim 3, wherein the transverse array comprises two or more sub-arrays.

14. The apparatus of claim 3, wherein the blades are uniformly spaced within the transverse array.

15. The apparatus of claim 3, wherein the blades are non-uniformly spaced within the transverse array.

16. The apparatus of claim 3, wherein the plenum comprises an upstream element of a selective catalytic reduction (SCR) system, and wherein the transverse array is configured for redirecting a gas flow into the SCR system.

17. A method of designing a transverse array of flat blades for use in redirecting fluid flow in a plenum from a first flow direction to a second flow direction, said method comprising: defining a transverse blade length as a function of an interior cross section at a position within the plenum where the transverse array is to be mounted; and adjusting at least one of a blade height, blade spacing, and blade angle as needed to achieve a desired flow quality for the fluid flow; and wherein adjusting a blade spacing comprises adjusting the blade spacing between adjacent blades in the transverse array to be about W/30 or less, where W is a plenum width measured in the first flow direction at an outlet side of the transverse array, such that the blades are at an angle of from 15 to 25° relative to the second flow direction and upstream blade edges define a plane positioned diagonally with the plenum to intersect both the first and second flow directions.

18. The method of claim 17, further comprising adjusting the blade angle by adjusting a planned mounting angle of the transverse array within the plenum.

19. A method of designing a transverse array of flat blades for use in redirecting fluid flow in a plenum from a first flow direction to a second flow direction, said method comprising: defining a transverse blade length as a function of an interior cross section at a position within the plenum where the transverse array is to be mounted; and adjusting at least one of a blade height, blade spacing, and blade angle as needed to achieve a desired flow quality for the fluid flow; and wherein adjusting a blade spacing comprises adjusting the blade spacing between adjacent blades in the transverse array to be about W/30 or less, where W is a plenum width measured in the first flow direction at an outlet side of the transverse array, wherein adjusting at least one of a blade height, blade spacing, and blade angle as needed to achieve a desired flow quality for the fluid flow comprises simulating fluid flow in a simulation model of the transverse array, assessing a modeled flow quality against one or more quality requirements, and adjusting one or more of a modeled blade height, modeled blade spacing, and modeled blade angle until the modeled flow quality meets the one or more flow quality requirements.

20. The method of claim 19, wherein adjusting at least one of a blade height, blade spacing, and blade angle as needed to achieve a desired flow quality for the fluid flow comprises initializing a transverse array design using a default blade height, a default blade spacing, and a default blade angle.

21. The method of claim 20, further comprising setting the default blade height and the default blade spacing according to a blade height to blade spacing ratio of about two-to-one.

22. The method of claim 20, further comprising setting the default blade height to about twelve inches and correspondingly setting the default blade spacing to about six inches.

23. The method of claim 20, further comprising setting the default blade angle to about nineteen degrees relative to the second flow direction.

24. The method of claim 19, wherein initializing the transverse array design using a default blade height, a default blade spacing, and a default blade angle comprises setting the default blade height to a value in a range from six inches to eighteen inches, setting the default blade spacing in a range from three inches to about twenty-four inches, and setting the default blade angle from about minus twenty-five degrees to about plus twenty-five degrees.

25. A method of designing a transverse array of flat blades for use in redirecting fluid flow in a plenum from a first flow direction to a second flow direction, said method comprising: defining a transverse blade length as a function of an interior cross section at a position within the plenum where the transverse array is to be mounted; and adjusting at least one of a blade height, blade spacing, and blade angle as needed to achieve a desired flow quality for the fluid flow; and wherein adjusting a blade spacing comprises adjusting the blade spacing between adjacent blades in the transverse array to be about W/30 or less, where W is a plenum width measured in the first flow direction at an outlet side of the transverse array, further comprising adjusting the actual blade spacing away from a default blade spacing to reduce an aggregate blade count for the transverse array, while compensating for the increased blade spacing by correspondingly adjusting one or both of the blade height and blade angle.

* * * * *